(12) United States Patent
Boucherie

(10) Patent No.: US 6,451,229 B1
(45) Date of Patent: Sep. 17, 2002

(54) METHOD OF MOLDING TOOTHBRUSHES AND APPARATUS FOR PERFORMING THE METHOD

(75) Inventor: Bart Gerard Boucherie, Izegem (BE)

(73) Assignee: G.B. Boucherie N.V., Izegem (BE)

(*) Notice: Subject to any disclaimer, the term of this patent is extended or adjusted under 35 U.S.C. 154(b) by 0 days.

(21) Appl. No.: 09/530,266

(22) PCT Filed: Oct. 29, 1998

(86) PCT No.: PCT/EP98/06855

§ 371 (c)(1),
(2), (4) Date: Apr. 28, 2000

(87) PCT Pub. No.: WO99/22925

PCT Pub. Date: May 14, 1999

(30) Foreign Application Priority Data

Oct. 30, 1997 (GB) ............................................. 9722946

(51) Int. Cl.[7] .............................................. B29C 45/77
(52) U.S. Cl. .................... 264/40.1; 264/243; 264/328.1; 425/146; 425/149
(58) Field of Search ............................. 264/40.1, 40.5, 264/328.1, 243; 425/145, 146, 149, 564, 565, 147

(56) References Cited

U.S. PATENT DOCUMENTS

| | | |
|---|---|---|
| 4,490,315 A | 12/1984 | Charlebois et al. |
| 5,143,424 A * | 9/1992 | Boucherie .................. 264/243 |

FOREIGN PATENT DOCUMENTS

| | | |
|---|---|---|
| DE | 35 12 192 | 10/1986 |
| DE | 40 34 811 | 5/1992 |
| DE | 195 13 451 | 10/1996 |
| EP | 0 141 531 | 5/1985 |
| EP | 310905 | * 4/1989 |
| EP | 0 676 268 | 10/1995 |
| GB | 917 522 | 2/1963 |
| GB | 2288762 | * 11/1995 |
| HU | 215 934 | 4/1999 |
| WO | WO 98/00279 | 1/1998 |
| WO | WO 98/05487 | 2/1998 |
| WO | WO 98/18609 | 5/1998 |

OTHER PUBLICATIONS

P9903853—Hungarian language abstract.
P9904146—Hungarian language abstract.
P9904272—Hungarian language abstract.
Patent Abstracts of Japan, vol. 4, No. 116 (M–27), Aug. 10, 1980; JP 55–074849, Jun. 5, 1980.

* cited by examiner

Primary Examiner—Jill L. Heitbrink
(74) Attorney, Agent, or Firm—Nixon Peabody LLP; Stuart J. Friedman

(57) ABSTRACT

In the proposed method of molding toothbrushes, a mold with relatively movable mold parts (14, 16) defining at least one molding cavity (20) corresponding in shape to a toothbrush body is used. One of the mold parts (16) has a brush head defining cavity portion with a plurality of holes (24) for partial penetration into the cavity portion of a like number of fiber tufts. Plasticized molding material is injected under pressure into the cavity (20). Pressure within the cavity is sensed during the injecting step. The injection is stopped when the pressure within the cavity exceeds a predetermined pressure value, thereby avoiding any leakage of molding material through the holes (24).

11 Claims, 3 Drawing Sheets

METHOD OF MOLDING TOOTHBRUSHES AND APPARATUS FOR PERFORMING THE METHOD

The present invention relates to a method of molding toothbrushes and to an apparatus for performing the method.

Molding of toothbrushes with tufts of fibre or bristles incorporated in the head portion of the brush body during the injection step involves a specific problem. One of the relatively movable mold parts has a brush head defining cavity portion with a plurality of holes for partial penetration into the cavity portion of a like number of fibre tufts. Due to the viscosity of the heated plasticized molding material and to the pressure within the cavity during injection, leakage is likely to occur through the holes in the brush head defining cavity portion. Many attempts have been made to avoid such leakage. One of such attempts, as disclosed in EP 0 676 268 A1, was to form a knob of molten material at each tuft end, and holding such knob against the edge defining the corresponding hole in the brush head defining cavity portion during injection of the plasticized material. Another attempt (DE 38 32 520 A1) was to introduce pins coaxially into each tuft to urge the bristles radially outwardly against the wall of the hole. However, none of these attempts was successful in reliably avoiding any leakage.

The present invention proceeds from the idea that the only manner to avoid such leakage is a precise and consistent control of pressure within the mold cavity during injection. In accordance with the invention, a mold with relatively movable mold parts defining at least one molding cavity corresponding in shape to a toothbrush body is used. One of the mold parts has a brush head defining cavity portion with a plurality of holes for partial penetration into the cavity portion of a like number of fibre tufts. The inventive method comprises the steps of providing a supply of plasticized molding material, injecting the plasticized material under pressure into the cavity, sensing pressure within the cavity during the injecting step, and stopping injection when the pressure within the cavity exceeds a predetermined pressure value. Although usual molds are equipped with pressure sensing and pressure adjusting means, the invention proposes to sense pressure during the injection step in the very cavity, and in the preferred embodiment, at one end of the elongate cavity which corresponds to the brush head portion. In the preferred embodiment, the injection of molding material is performed through a narrow injection channel which opens into the cavity at an end opposite the end where pressure is sensed, and stopping of injection is carried out by suddenly blocking material flow through the channel at a location close to the cavity.

In the preferred embodiment of the method, a plurality of toothbrushes are simultaneously molded in a plurality of cavities and pressure is sensed in each cavity. Stopping of injection in each individual cavity is controlled by pressure sensed in that cavity. Although a mold with a plurality of like cavities is usually provided with a balanced manifold system, identical amounts of pressure in each cavity cannot be achieved due to manufacture tolerances and fluctuations of the molding parameters such as viscosity and temperature. By sensing pressure within each cavity and individually controlling a valve member associated with each cavity, in dependence upon pressure sensed in that cavity, identical pressure conditions can be achieved throughout the cavities.

The predetermined pressure level at which supply of molding material of the cavities is suddenly stopped must be selected below a value where leakage starts to occur. The appropriate pressure level will depend on the nature of the molding material and on the characteristics of the mold. It can be determined empirically.

The invention is not limited to methods wherein the brush body is molded from a single molding material. Rather, a first molding material can be injected in a first injection step forming a frame brush incorporating the fibre tufts, and at least one further molding material component is injected in a second molding step to complete the toothbrush.

A precise pressure control as described in this invention may only be needed during the first injection step. However, a second control system may be needed if the second component also imbeds (part of) the tufted portion of the brush or if the second component gets into the vicinity thereof (eg. for brushes featuring second component in the brushhead).

The invention also provides an apparatus for performing the method. The apparatus comprises a mold with relatively movable mold parts defining at least one molding cavity corresponding in shape to a toothbrush body. The cavity has a brush head defining cavity portion with a plurality of holes for partial penetration into the cavity portion of a like number of fibre tufts. The apparatus further comprises a plasticizing and pressurizing supply unit. A narrow supply channel connects the cavity with said supply unit. A pressure sensor is associated with the cavity. A valve member adapted to shut off the supply channel is arranged adjacent the cavity. A control unit controls the valve member in dependence upon pressure sensed by the pressure sensor within the cavity. In the preferred embodiment of the apparatus, the mold comprises a plurality of like cavities, and the supply unit comprises a manifold with a plurality of supply channels each connected to one of the cavities, and each supply channel has an associated valve member. Preferably, each valve member is controlled individually by the control unit in dependance upon pressure sensed in the associated cavity.

Further details of the invention will become apparent from the following description of two embodiments of the invention, with reference to the drawings. In the drawings:

FIG. 1 diagramatically shows an apparatus for performing the inventive method;

Figure 1:
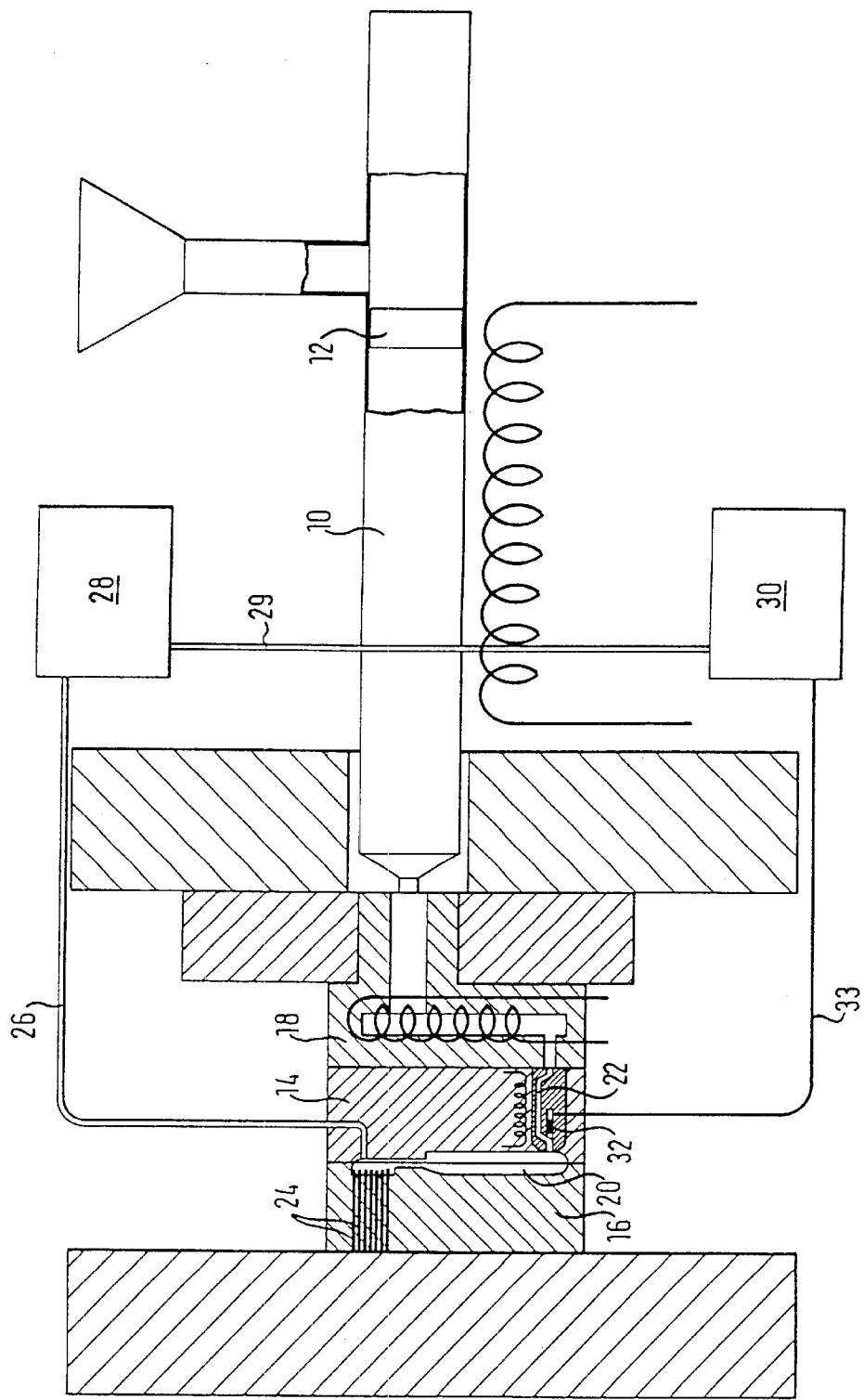
Figure 2:
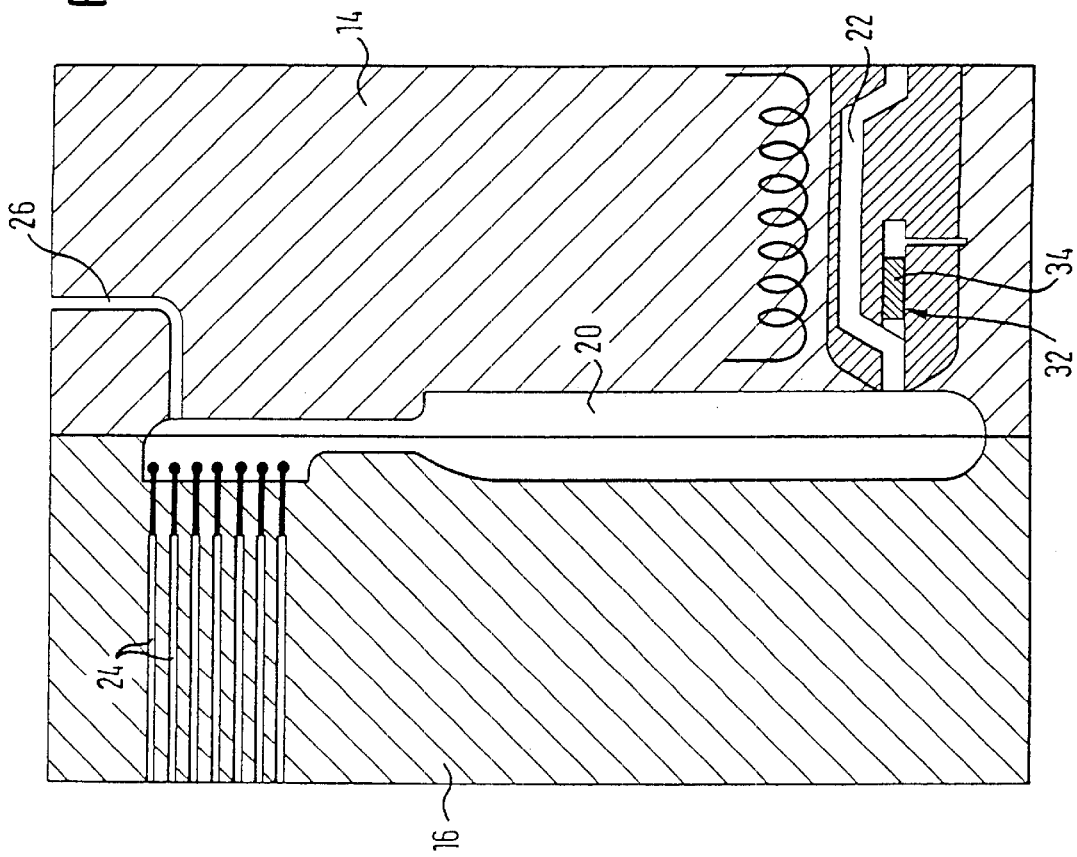
FIG. 2 is an enlarged partial view of the apparatus.

The apparatus shown in FIG. 1 includes a conventional plasticizing and pressurizing supply unit with a cylinder 10 and a plunger 12 and a mold with a first, stationary mold part 14 and a second, movable mold part 16. The cylinder 10 is filled with pellets of a thermoplastic molding material which are plasticized within the cylinder through a combination of mechanical and thermal treatment. The mold is connected to cylinder 10 by a manifold system 18.

Mold parts 14, 16 commonly define a cavity which has the elongate shape of a toothbrush body. A narrow supply channel 22 extends from one end of cavity 20 through stationary mold part 14 and is connected to the manifold system 18. On the opposite end of cavity 20 which corresponds to the toothbrush head, the movable mold part 16 has a number of holes 24 for the introduction of fibre tufts, the ends of which slightly project into cavity 20. A pressure sensing line 26 is connected to the same end of cavity 20. Pressure sensing line 26 is connected to an input of a controller 28. A valve member 32 formed as a gate valve with a movable shutter 34 is arranged near the end of supply channel 22 opening into cavity 20 so that the supply channel 22 can be selectively shut off. A hydraulic control unit 30 has an input connected to an output of controller 28 by a signalling line 29 and an output connected to valve member 32 by a control line 33.

In operation, plasticized molding material is supplied by the supply unit through manifold 18 and supply channel 22 into cavity 20 after a set of tufts has been introduced through the holes 24 in movable mold part 16. During injection of the molding material into cavity 20, the pressure within the cavity is monitored in controller unit 28. More specifically, the pressure is sensed at the end of cavity 20 which corresponds to the brush head, i.e. the location within cavity 20 where pressure is most critical. When a predetermined pressure value is reached at that location of cavity 20, a control signal is sent from the controller unit 28 to the hydraulic control unit 30 which, in turn, controls valve member 32 to suddenly block the flow of molding material towards cavity 20. The predetermined pressure value is selected slightly lower than a value where molding material starts leaking through holes 24. The pressure value where leakage of molding material starts to occur depends on the nature of the molding material and other molding parameters, and can be determined emperically.

Figure 3:
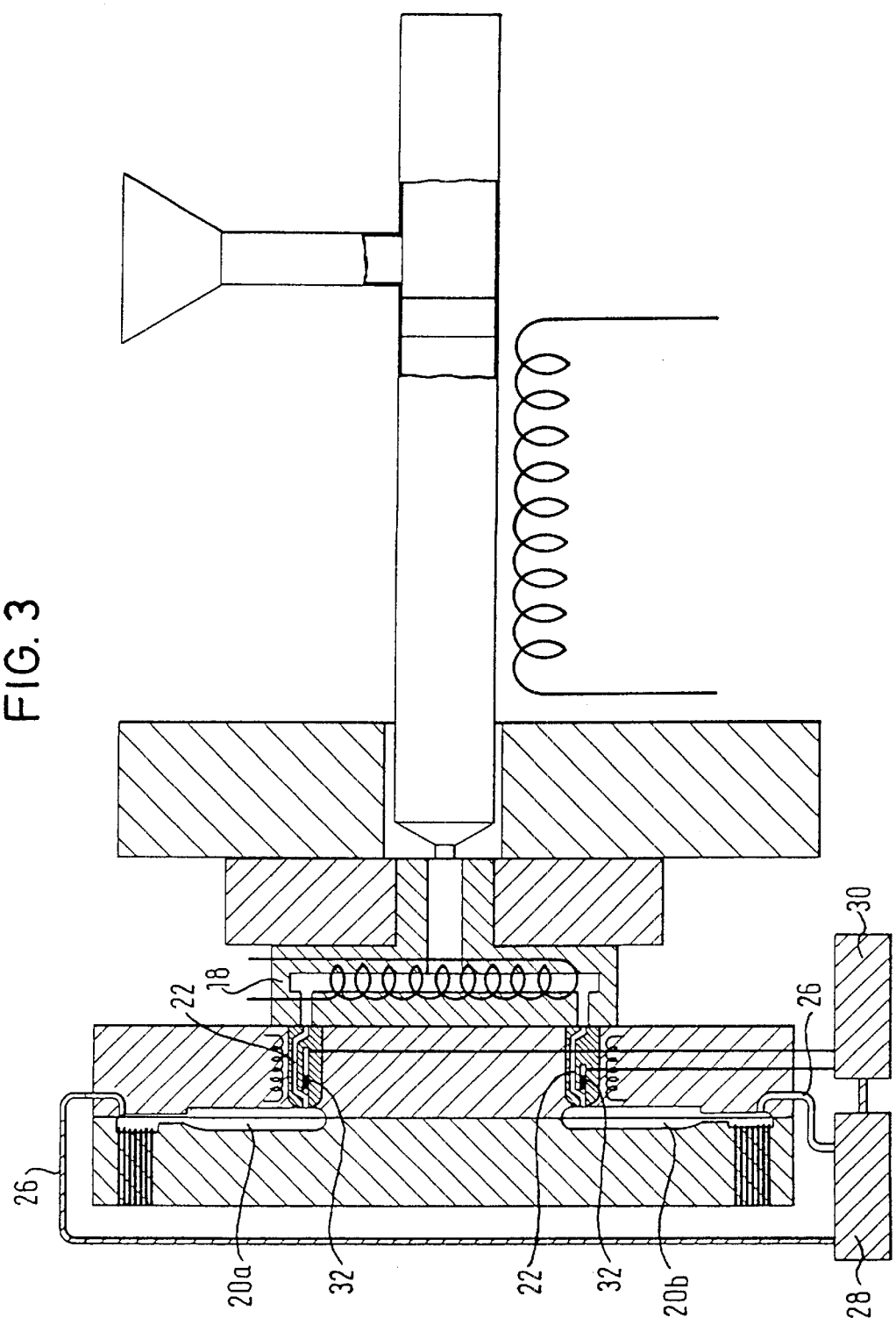
FIG. 3 is a diagramatical view of a second embodiment of the apparatus.

The embodiment of FIG. 3 is generally similar to that of FIG. 1 and differs only in that a plurality of like mold cavities 20a, 20b are provided which are connected to the common manifold system 18, each through a separate supply channel 22 with an associated valve member 32. Each cavity 20a, 20b has its cavity portion corresponding to the brush head connected by an associated pressure sensing line 26 to the control unit 20a. The hydraulic control unit 30 is connected to each of the valve members 32. Although two cavities 20a, 20b are shown in FIG. 3, a number of similar cavities can be arranged in two or more rows, in a closely spaced and parallel relationship in each row.

In operation of the appartus, the pressures in all cavities are monitored during injection, and the valve members of all cavities are individually controlled in dependence of sensed pressure in corresponding cavities. The predetermined pressure value can be the same for all cavities if the manifold system 18 is balanced and the temperature control is sufficiently precise throughout the mold. Alternatively, a set of predetermined pressure values can be defined, one for each cavity.

Although pressure sensing lines 26 are shown in the drawings, a pressure sensor can be arranged immediately adjacent the mold cavity, and the pressure sensing line may be an electric cable. Although it is preferred to sense the pressure within the cavity in the cavity portion corresponding to the brush head, pressure could be sensed at other locations within the cavity.

Finally, it should be noted that the valve members can be controlled by other than hydraulic means, for example mechanical, magnetic or pneumatic.

What is claimed is:

1. A method of molding toothbrushes using a mold with relatively movable mold parts, said mold parts defining at least one molding cavity corresponding in shape to a toothbrush body, one of said mold parts having a brush head defining cavity portion and a plurality of holes for the introduction of fiber tufts into said cavity portion, said holes projecting into said cavity portion, the method comprising the steps of:

providing a supply of plasticized molding material, injecting said plasticized material under pressure into said cavity;

sensing and monitoring pressure within said cavity during the injecting step, and stopping injection when the pressure within said cavity exceeds a predetermined pressure value.

2. The method of claim 1, wherein injection of the molding material is performed from a first longitudinal end of said cavity and pressure is sensed at a second, opposed longitudinal end of said cavity.

3. The method of claim 2, wherein pressure is sensed within the brush head defining cavity portion.

4. The method according to claim 1, wherein injection of the molding material is performed through a narrow injection channel and stopping of injection is carried out by suddenly blocking material flow through said channel at a location close to said cavity.

5. The method according to claim 1, wherein said predetermined pressure value is selected below a value where molding material leaks through said holes in the brush head cavity defining portion.

6. The method according to claim 1, wherein a plurality of toothbrushes are simultaneously molded in a plurality of cavities and pressure is sensed in each cavity, and stopping of injection in each individual cavity is controlled by pressure sensed in that cavity.

7. The method according to claim 1, wherein a first molding material component is injected in a first injection step forming a frame brush incorporating the fibre tufts, and at least one further molding material component is injected in a second molding step to complete the toothbrush.

8. The method of claim 7, wherein pressure is sensed within the cavity only in the first injection step.

9. A molding apparatus for molding toothbrushes, said apparatus comprising a mold with relatively movable mold parts, said mold parts defining at least one molding cavity corresponding in shape to a toothbrush body, said cavity having a brush head defining cavity portion with a plurality of holes for the introduction of fiber tufts into said cavity portion, said holes projecting into said cavity portion, said apparatus further comprising a plasticizing and pressurizing supply unit, characterized by a narrow supply channel connecting said cavity with said supply unit, a pressure sensor associated with said cavity, a valve member adapted to shut off said supply channel adjacent said cavity and a control unit controlling said valve member in dependence upon pressure sensed by said pressure sensor within said cavity.

10. The apparatus of claim 9, wherein said mold comprises a plurality of like cavities and said supply unit comprises a manifold with a plurality of supply channels each connected to one of said cavities, and each supply channel having an associated valve member.

11. The apparatus of claim 10, wherein each of said valve members is controlled individually by said control unit in dependence upon pressure sensed in the associated cavity.

* * * * *